United States Patent
Lee et al.

(10) Patent No.: US 8,203,234 B2
(45) Date of Patent: Jun. 19, 2012

(54) POWER SAFETY SYSTEM

(75) Inventors: Li-Wei Lee, Zhubei (TW); Nien-Hui Kung, Hsinchu (TW); Kwan-Jen Chu, Hsinchu (TW); Chun-Tsung Chen, Taipei (TW)

(73) Assignee: Richtek Technology Corp., Hsinchu (TW)

( * ) Notice: Subject to any disclaimer, the term of this patent is extended or adjusted under 35 U.S.C. 154(b) by 331 days.

(21) Appl. No.: 12/720,024

(22) Filed: Mar. 9, 2010

(65) Prior Publication Data

US 2010/0231047 A1 Sep. 16, 2010

(30) Foreign Application Priority Data

Mar. 13, 2009 (TW) .............................. 98108282 A

(51) Int. Cl.
*H02J 1/10* (2006.01)
*H02J 3/38* (2006.01)

(52) U.S. Cl. .............. 307/51; 307/326; 361/56; 361/82; 361/84; 320/163

(58) Field of Classification Search ........................ None
See application file for complete search history.

(56) References Cited

U.S. PATENT DOCUMENTS

| 8,098,053 | B2 * | 1/2012 | Sato | 320/163 |
| 2008/0303487 | A1 * | 12/2008 | Bernard et al. | 320/163 |
| 2009/0147422 | A1 * | 6/2009 | Nakahara | 361/84 |

* cited by examiner

*Primary Examiner* — Rexford Barnie
*Assistant Examiner* — Justen Fauth
(74) *Attorney, Agent, or Firm* — Rosenberg, Klein & Lee

(57) ABSTRACT

A power safety system includes a first MOS, a second MOS, a switch and a body controller. The first MOS is connected between a power input and a power output. The second MOSFET is connected between the power output and a charging output. The switch has an end connected to the body of the first MOS, and the opposite end switched between the source and the drain of the first MOS. A body controller controls the switch according to the voltage at the power input and the voltage at the power output, to connect the body of the first MOS to the source or the drain of the first MOS. By switching the switch, the first MOS will have a parasitic diode effective to prevent a reverse current from the power output to the power input.

10 Claims, 2 Drawing Sheets

POWER SAFETY SYSTEM

FIELD OF THE INVENTION

The present invention is related generally to a power safety system and, more particularly, to a circuit and method for preventing a reverse current in a power safety system.

BACKGROUND OF THE INVENTION

Devices powered by a single alternating-current (AC) or direct-current (DC) power supply do not have much portability. While battery-driven devices are portable, the limited energy capacity of batteries leads to inconvenience of use. A device that can be powered by both a power supply and a battery is configured in such a way that the power supply and the battery are connected in parallel to a load system and that at least a diode is connected in series between the battery and the load system. If the battery is rechargeable, a charger is additionally provided so as to charge the battery while an AC or DC power supply is being used. Thus, the battery has its service life extended, and the frequency of battery change is reduced. Recently, it is common practice to add a power management device to a battery charger to control the charging current to the battery, thereby not only increasing charging efficiency and prolonging the battery's service life, but also providing enhanced protection to the battery. However, when applied to a device that is powered by both a power supply and a battery, this type of battery charger may result in reverse current. Since the service life of a rechargeable battery is related to the number of times the battery has been charged and discharged, the battery may die earlier than it should due to the reverse current. Referring to FIG. 1, a device that is powered by both a power supply and a battery includes two current paths for connecting an AC power supply ACIN and a battery 10 to a load system in parallel. The load system typically has a power converter for converting the voltage V4 at a power output OUT of the power system into an appropriate voltage. A MOS transistor M3 controls the input current supplied by the AC power supply ACIN, an over-voltage protection (OVP) device 12 will turn off the MOS transistor M3 when the voltage V2 at a power input IN of the power system is too high, and a parasitic diode D3 of the MOS transistor M3 has a cathode connected to the power input IN so that the MOS transistor M3, when turned off, completely cuts off the current from the AC power supply ACIN. A MOS transistor M1 controls the charging current that flows to the battery 10, and a power management device 14 detects the voltage V6 at the charging output BATT to turn off the MOS transistor M1 when the voltage V6 exceeds a preset value, thus preventing the battery 10 from being overcharged. The MOS transistor M1 has a parasitic diode D1 whose cathode is connected to the power output OUT to allow current flowing from the battery 10 to the power output OUT when the MOS transistor M1 is turned off. In this circuit, however, whenever the voltage V2 at the power input IN becomes lower than the voltage V6 at the charging output BATT, a reverse current flows from the battery 10 to the AC power supply ACIN. Even if the MOS transistors M1 and M3 both are turned off, the reverse current can flow to the AC power supply ACIN through the parasitic diodes D1 and D3, thus reducing the service life of the battery 10.

To prevent this reverse current, a diode D4 is connected to the power input IN in series. However, the diode D4 will cause the voltage V4 to be lower than the voltage at the AC power supply ACIN by a forward bias of the diode D4 and thereby reduce the efficiency of charging the battery 10.

As an alternative approach to preventing the above-illustrated reverse current, a MOS transistor M2 is connected in series between the MOS transistor M1 and the charging output BATT, and the MOS transistor M2 has a parasitic diode D2 whose cathode is connected to the charging output BATT. This approach requires relatively complex control. When the MOS transistor M2 is turned off, the battery 10 provides no current, but as long as the voltage V2 at the power input IN is higher than the voltage V6 at the charging output BATT, the MOS transistor M1 still can be controlled to charge the battery 10. When the MOS transistor M2 is turned on, and the voltage V2 at the power input IN is lower than the voltage V6 at the charging output BATT, current is supplied by the battery 10, and yet a reverse current also flows to the AC power supply ACIN. In order to prevent any such reverse current from flowing to the AC power supply ACIN, it is again necessary to connect the diode D4 in series. Also, the addition of the MOS transistor M2 lowers the efficiency. When the battery 10 is being charged, the voltage V6 is lower than the voltage V4 by a voltage drop of the MOS transistor M2 or its parasitic diode D2. On the other hand, when the battery 10 supplies current, the voltage V4 is lower than the voltage V6 by a voltage drop of the MOS transistor M2. Those voltage drops result in lower efficiency.

In addition, the use of the diode D4 or the MOS transistor M2 increases the size and cost of the circuit. More particularly, both the diode D4 and the MOS transistor M2 are located in a current-supplying path to the load system and thus, they must be power components in support of the resultant large current. The power components, which are large and expensive, significantly increase the size and cost of the circuit. Nowadays, all these power components are external separated components that cannot be integrated into a controller chip, making it impossible to reduce the size and cost of the whole circuit.

The problems mentioned above also exist in other similar systems such as those using an AC/DC converter or a USB-based DC power supply in place of the aforesaid AC power supply ACIN.

SUMMARY OF THE INVENTION

It is an object of the present invention to provide a power safety system and, in particular, a circuit and a method for preventing a reverse current in a power safety system.

It is another object of the present invention to provide a highly efficient power safety system.

It is a further object of the present invention to provide a smaller and lower cost power safety system.

According to the present invention, a power safety system includes a first MOS transistor connected between a power input and a power output, an amplifier for determining a first control signal to be applied to a gate of the first MOS transistor, a second MOS transistor connected between the power output and a charging output, a power management device for determining a second control signal to be applied to a gate of the second MOS transistor, a switch having an end connected to a body of the first MOS transistor, and an opposite end to be switched between a source and a drain of the first MOS transistor, and a body controller for determining a third control signal to signal the switch to connect the body of the first MOS transistor to the source or the drain of the first MOS transistor.

According to the present invention, a method for a power safety system includes determining a first control signal according to a voltage at a power input and a voltage at a power output to apply to a gate of a first MOS transistor connected between the power input and the power output, determining a second control signal according to a voltage at a charging output to apply to a gate of a second MOS transistor connected between the power output and the charging output, and determining a third control signal according to the voltage at the power input and the voltage at the charging output to connect a body of the first MOS transistor to a source or a drain of the first MOS transistor.

By switching the body of the first MOS transistor to the source or the drain of the first MOS transistor, the bias direction of a parasitic diode of the first MOS transistor is controlled so as to prevent a reverse current which might otherwise flow from the power output to the power input. In a power safety system according to the present invention, no additional diodes or MOS transistors are required for separating the circuit of the power safety system from a power supply or a battery. Consequently, the efficiency is enhanced while the size and cost of the circuit are reduced. Besides, the switch and the body controller can be implemented by very small circuits and integrated into a controller chip.

BRIEF DESCRIPTION OF THE DRAWINGS

These and other objects, features and advantages of the present invention will become apparent to those skilled in the art upon consideration of the following description of the preferred embodiments of the present invention taken in conjunction with the accompanying drawings, in which.

DETAILED DESCRIPTION OF THE INVENTION

When a MOS transistor has its body connected to its source or drain, a parasitic diode is formed between the source and the drain due to the PN junction in the semiconductor structure. The bias direction of this parasitic diode can be controlled by selectively connecting the body of the MOS transistor to the source or the drain of the MOS transistor.

Figure 1:
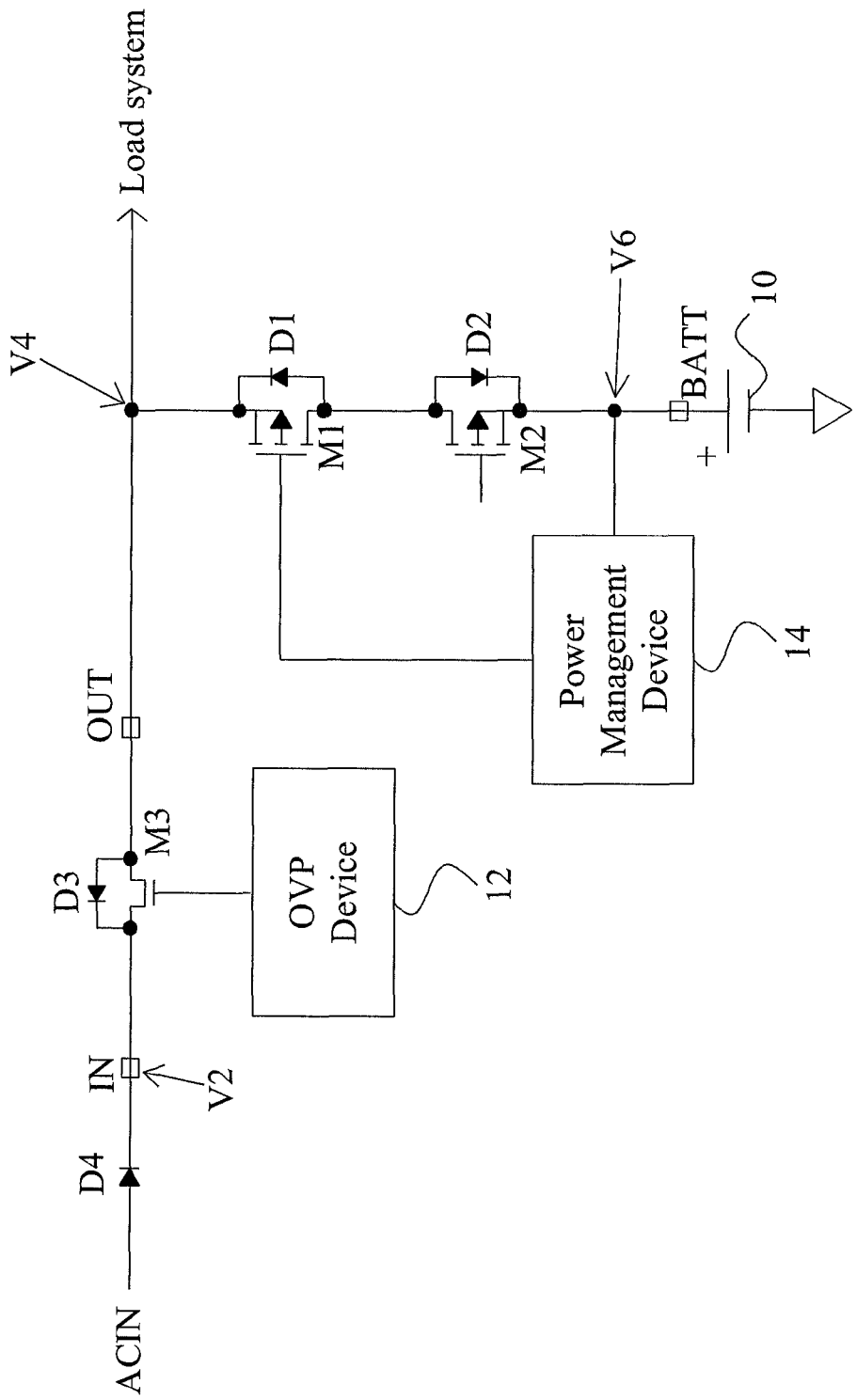
FIG. 1 is a circuit diagram of a conventional power safety system.
Figure 2:
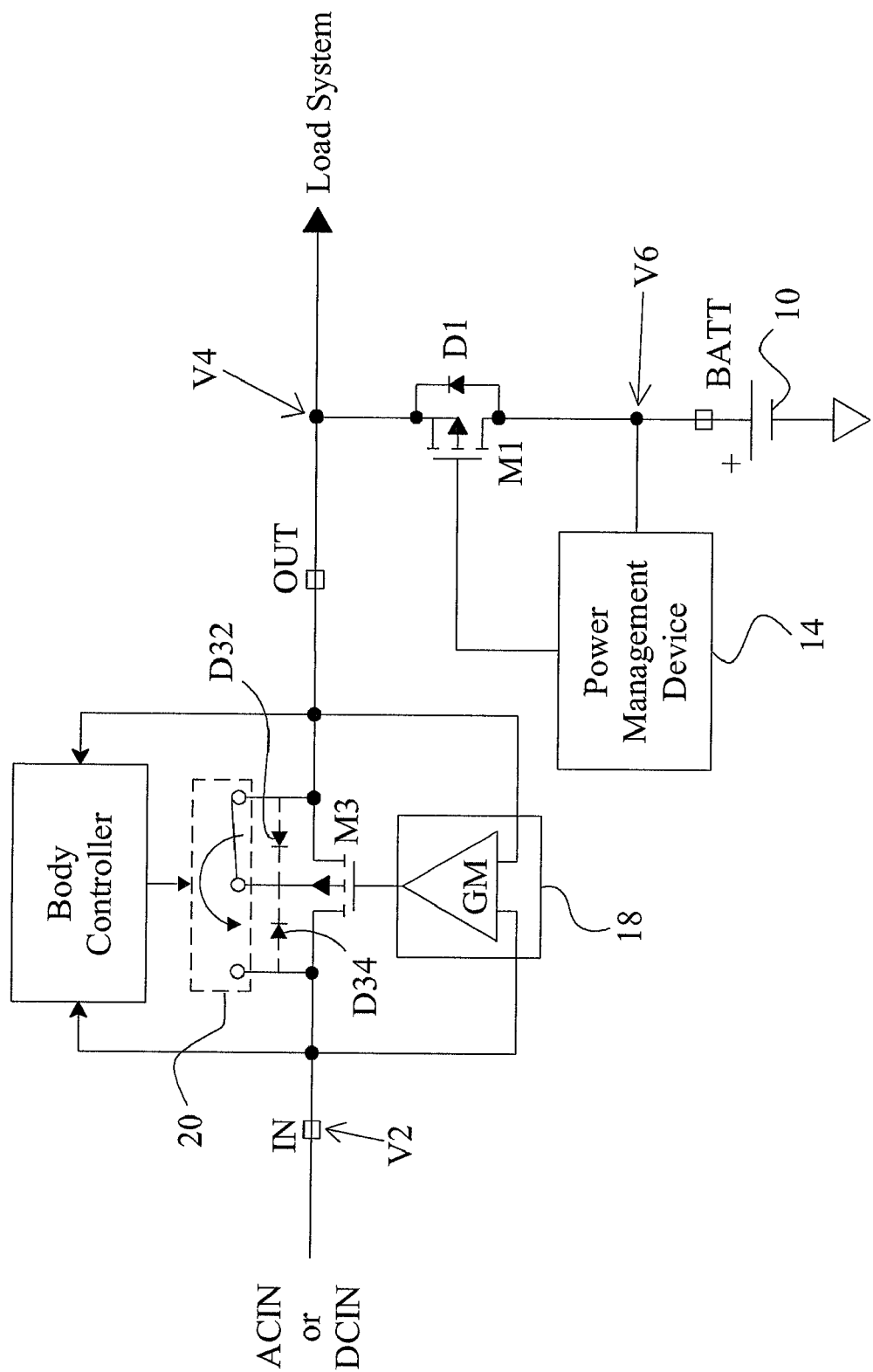
FIG. 2 is a circuit diagram of a power safety system according to the present invention.

FIG. 2 is a circuit diagram of an embodiment according to the present invention, in which a power safety system has a similar circuit design to that depicted in FIG. 1. This power safety system includes a power input IN to be connected with an AC power supply ACIN or a DC power supply DCIN, a power output OUT to be connected to a load system, a MOS transistor M3 connected between the power input IN and the power output OUT, an amplifier 18 connected to the power input IN, the power output OUT, and a gate of the MOS transistor M3, a charging output BATT to be connected to a battery 10, a MOS transistor M1 connected between the power output OUT and the charging output BATT, a power management device 14 connected between a gate of the MOS transistor M1 and the charging output BATT, and a combination of a switch 20 and a body controller 22 to prevent a reverse current which might otherwise flow to the AC power supply ACIN or the DC power supply DCIN.

The MOS transistor M3 controls the input current from the AC power supply ACIN or the DC power supply DCIN, and the amplifier 18 monitors the voltage V2 at the power input IN and the voltage V4 at the power output OUT. When the difference between the voltages V2 and V4 is smaller than a preset value, the amplifier 18 applies a first control signal to the gate of the MOS transistor M3 to turn on the MOS transistor M3 and maintain the difference between the voltages V2 and V4 at a constant value. Preferably, the MOS transistor M3 includes a PMOS which is normally ON. The amplifier 18, preferably a transconductive amplifier, provides a current to charge the gate of the MOS transistor M3 so as to produce a gate voltage thereon. When the difference between the voltages V4 and V2 is smaller than the preset value, the current provided by the amplifier 18 will be too low to produce a sufficient gate voltage and as a result, the MOS transistor M3 remains ON. On the other hand, the MOS transistor M1 controls the charging current flowing to the charging output BATT, and the power management device 14 monitors the voltage V6 at the charging output BATT to determine a second control signal to control the MOS transistor M1 and thereby control (e.g., turn off, increase or decrease) the charging current. Preferably, the MOS transistor M1 includes a PMOS which is normally ON.

The body controller 22 is connected to the switch 20, the power input IN, and the power output OUT, and monitors the voltages V2 and V4 to determine a third control signal for the switch 20. The switch 20 has one end connected to a body of the MOS transistor M3 and an opposite end to be connected to a source or a drain of the MOS transistor M3 in response to the third control signal. This power safety system uses a first parasitic diode D32 and a second parasitic diode D34 constructed by different internal structures of the MOS transistor M3 to provide a protection function.

In an embodiment, the body controller 22 compares the voltages V2 and V4 to determine the third control signal. If the voltage V2 is higher than the voltage V4, the third control signal is at a first state, thus signaling the switch 20 to connect the body of the MOS transistor M3 to the drain of the MOS transistor M3 and in consequence, the first parasitic diode D32 whose anode connected to the power output OUT and whose cathode connected to the power input IN, becomes effective. If the voltage V2 is lower than the voltage V4, the third control signal is at a second state, thus signaling the switch 20 to connect the body of the MOS transistor M3 to the source of the MOS transistor M3 so that the second parasitic diode D34 takes effect, wherein the second parasitic diode D34 has its anode connected to the power input IN and its cathode connected to the power output OUT. Therefore, in either case, no reverse current will flow to the power supply ACIN or DCIN.

Since neither the switch 20 nor the body controller 22 is located in a current-supplying path from the power supply to the load system, no power components are required, and a very small circuit will suffice, thereby lowering the size and cost of the circuit. In addition, the switch 20 and the body controller 22 can be integrated into a controller chip, along with the power management device 14 and the amplifier 18, thus further reducing the size and cost of the circuit. Moreover, the switch 20 and the body controller 22 only operate to select reverse-biased diode D32 or D34, without affecting the operation of other components in the circuit.

When the voltage V2 at the power input IN is higher than the voltage V6 at the charging output BATT, the power supply ACIN or DCIN can supply power to the load system and charge the battery 10 at the same time. When the battery 10 is charged so that the voltage V6 exceeds a preset value, the second control signal turns off the MOS transistor M1 to stop charging the battery 10. While the MOS transistor M1 is OFF, if the voltage V6 at the charging output BATT is higher than the voltage V2 at the power input IN, it is still possible for the battery 10 to supply current to the power output OUT through a parasitic diode D1 of the MOS transistor M1. In contrast to the circuit of the conventional power safety system shown in FIG. 1, the circuit of FIG. 2 is configured in such a way that no extra voltage drop will present in the current-supplying path, regardless of whether it is the power supply or the battery 10 that supplies a current to the load system. Besides, while the battery 10 is being charged, there is no extra voltage drop, either. Therefore, the circuit of FIG. 2 has higher efficiency than that of FIG. 1.

In an integrated circuit, the structure of a MOS transistor is manufactured in a well and therefore, the body of the MOS transistor will be the well containing the MOS transistor.

While the present invention has been described in conjunction with preferred embodiments thereof, it is evident that many alternatives, modifications and variations will be apparent to those skilled in the art. Accordingly, it is intended to embrace all such alternatives, modifications and variations that fall within the spirit and scope thereof as set forth in the appended claims.

What is claimed is:

1. A power safety system, comprising:
a power input to be connected with a power supply;
a power output to be connected to a load system;
a first MOS transistor formed on a body, connected between the power input and the power output, and having a source, a drain, and a gate;
an amplifier connected to the power input, the power output, and the gate of the first MOS transistor, and configured to determine a first control signal according to a voltage at the power input and a voltage at the power output, to be applied to the gate of the first MOS transistor;
a charging output end to be connected to a battery;
a second MOS transistor connected between the power output and the charging output, and having a gate;
a power management device connected to the charging output and the gate of the second MOS transistor, and configured to monitor a voltage at the charging output to determine a second control signal to be applied to the gate of the second MOS transistor, thereby controlling a charging current flowing to the charging output;
a body controller connected to the power input, the power output, and the body of the first MOS transistor, and configured to determine a third control signal according to the voltage at the power input and the voltage at the power output; and
a switch having an end connected to the body of the first MOS transistor and an opposite end to be switched between the source and the drain of the first MOS transistor in response to the third control signal.

2. The power safety system of claim 1, wherein the first MOS transistor comprises a PMOS.

3. The power safety system of claim 1, wherein the amplifier is a transconductive amplifier configured to provide a current as the first control signal according to a difference between the voltage at the power input and the voltage at the power output.

4. The power safety system of claim 1, wherein the second MOS transistor comprises a PMOS.

5. The power safety system of claim 1, wherein the second MOS transistor has a parasitic diode having an anode and a cathode connected respectively to the charging output and the power output.

6. The power safety system of claim 1, wherein the first MOS transistor has a first parasitic diode having an anode and a cathode connected respectively to the power output and the power input when the third control signal is at a first state, and a second parasitic diode having an anode and a cathode connected respectively to the power input and the power output when the third control signal is at a second state.

7. A method for a power safety system which includes a first MOS transistor connected between a power input and a power output, and a second MOS transistor connected between the power output and a charging output, the method comprising:

(A) monitoring a voltage at the power input and a voltage at the power output to determine a first control signal to be applied to a gate of the first MOS transistor;

(B) monitoring a voltage at the charging output to determine a second control signal to be applied to a gate of the second MOS transistor, thereby controlling a charging current flowing to the charging output; and (C) monitoring the voltage at the power input and the voltage at the power output to determine a third control signal, wherein the first MOS transistor has a first parasitic diode having an anode and a cathode connected respectively to the power output and the power input when the third control signal is at a first state, and a second parasitic diode having an anode and a cathode connected respectively to the power input and the power output when the third control signal is at a second state.

8. The method of claim 7, wherein the step A comprises:
comparing the voltage at the power input with the voltage at the power output; and
controlling the first MOS transistor with the first control signal when a difference between the voltage at the power input and the voltage at the power output is smaller than a preset value, so as to maintain the difference between the voltage at the power output and the voltage at the power input at a constant value.

9. The method of claim 7, wherein the step B comprises:
comparing the voltage at the charging output with a preset value; and
turning off the second MOS transistor with the second control signal when the voltage at the charging output exceeds the preset value.

10. The method of claim 7, wherein the step C comprises:
connecting a body of the first MOS transistor to a drain of the first MOS transistor when the third control signal is at a first state; and
connecting the body of the first MOS transistor to a source of the first MOS transistor when the third control signal is at a second state.

* * * * *